(12) United States Patent
Atta et al.

(10) Patent No.: US 11,915,110 B1
(45) Date of Patent: *Feb. 27, 2024

(54) SEMI-STRUCTURED DATA MACHINE LEARNING

(71) Applicant: Wells Fargo Bank, N.A., San Francisco, CA (US)

(72) Inventors: Asem Atta, Fort Mill, SC (US); Mahendra Sarvottam Telang, Pleasanton, CA (US); Randy Carl Lingen, Bloomington, MN (US); John Martin Burns, Charlotte, NC (US); Tali Bray, Piedmont, CA (US); Robert P. Carasik, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,393

(22) Filed: Jan. 30, 2023

Related U.S. Application Data

(63) Continuation of application No. 16/222,474, filed on Dec. 17, 2018, now Pat. No. 11,568,304.

(60) Provisional application No. 62/611,964, filed on Dec. 29, 2017.

(51) Int. Cl.
*G06N 20/00* (2019.01)
*H04L 43/045* (2022.01)
*G06F 16/835* (2019.01)

(52) U.S. Cl.
CPC .......... *G06N 20/00* (2019.01); *G06F 16/835* (2019.01); *H04L 43/045* (2013.01)

(58) Field of Classification Search
None
See application file for complete search history.

(56) References Cited

U.S. PATENT DOCUMENTS

| | | |
|---|---|---|
| 9,734,250 B2 | 8/2017 | Kelsey et al. |
| 11,568,304 B1 | 1/2023 | Atta et al. |
| 2018/0089291 A1 | 3/2018 | Vankamamidi et al. |
| 2018/0357556 A1 | 12/2018 | Rai et al. |
| 2018/0357595 A1 | 12/2018 | Rai et al. |

OTHER PUBLICATIONS

"U.S. Appl. No. 16/222,474, Advisory Action dated Feb. 24, 2022".
"U.S. Appl. No. 16/222,474, Examiner Interview Summary dated Jan. 28, 2022", 2 pgs.
"U.S. Appl. No. 16/222,474, Examiner Interview Summary dated Aug. 31, 2021".
"U.S. Appl. No. 16/222,474, Final Office Action dated Dec. 3, 2021", 10 pgs.
"U.S. Appl. No. 16/222,474, Non Final Office Action dated Apr. 1, 2022".

(Continued)

*Primary Examiner* — Oleg Survillo
*Assistant Examiner* — Christopher P Cadorna
(74) *Attorney, Agent, or Firm* — SCHWEGMAN LUNDBERG & WOESSNER, P.A.

(57) ABSTRACT

A method may include ingesting a plurality of sources files from a plurality of infrastructure assets; inputting the plurality of source files into a cognitive computing engine (CCE); receiving an output from the CCE, the output indicating a plurality of relationships between the infrastructure assets; and updating a data store based on the plurality of relationships.

20 Claims, 6 Drawing Sheets

(56) References Cited

OTHER PUBLICATIONS

"U.S. Appl. No. 16/222,474, Non Final Office Action dated Jun. 2, 2021".
"U.S. Appl. No. 16/222,474, Notice of Allowance dated Sep. 23, 2022".
"U.S. Appl. No. 16/222,474, Response filed Feb. 3, 2022 to Final Office Action dated Dec. 3, 2021".
"U.S. Appl. No. 16/222,474, Response filed Jul. 1, 2022 to Non Final Office Action dated Apr. 1, 2022", 10 pgs.
"U.S. Appl. No. 16/222,474, Response filed Sep. 2, 2021 to Non Final Office Action dated Jun. 2, 2021".

FIG. 3

ROUTER CONFIGURATION SNIPPET:

```
hostname f1-makr-5ar01
!
interface Serial0/0/1:0.111 point-to-point
 description FR+1.5M+PVC MPLS-VPN+COMPANYABC-EAST-UTL
 bandwidth 1536
 ip address 11.22.9.11 255.255.255.252
 ip pim sparse-mode
 ip multicast boundary GLOBAL-BOUNDARY-LOW
```

APPROACH MAY REQUIRE CORRELATING PIECES OF DATA, AS WELL AS NORMALIZATION

URL SURVEY ENTRIES:

| AppID | Associated URLs |
|---|---|
| QT5 | Prod Environment - https://castprod.companyabc.com:8221/cast/<br>BCP Environment - https://castbcp.companyabc.com:8221/cast/ |
| TCBA | Vanity url: tcsx-dvtst.companyabc.net<br>Azure Cloud Url: tcis-zys.sm3ad1.azure.companyabc.net |
| TBDEF | https://inosis.companyabc.com/Reports32/Page/Folder.aspx?ItemPath=%2fTurn+Back%2fDefense&ViewMode=List |

SEMI-STRUCTURED DATA MACHINE LEARNING

RELATED APPLICATIONS

This patent application is a continuation of U.S. patent application Ser. No. 16/222,474, filed on Dec. 17, 2018, now issued as U.S. Pat. No. 11,568,304, which claims the benefit of priority, under 35 U.S.C. § 119(e), to U.S. Provisional Patent Application Ser. No. 62/611,964, titled Semi-Structured Data Machine Learning," filed on Dec. 29, 2017, each of which are incorporated by reference in their entirety.

BACKGROUND

An enterprise may have thousands of assets (e.g., servers, web applications) that may interact to provide support to employees of the enterprise and services to customers of the enterprise. Each asset may be associated with multiple other assets. Thus, when an asset is compromised, degrades, etc., other assets connected to the asset may be impacted as well.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 3 illustrates a snippet of semi-structured data, according to various examples.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Enterprise environments include hundreds, or thousands, of network-connected assets (e.g., a device with an IP address, web applications). Knowing what each asset is responsible for, how the assets are logically and physical related, the status of each assets, the configuration of the asset, etc., (referred to herein as an infrastructure map) is often crucial to having a functional enterprise environment.

However, many problems exist with current techniques to generate the map of the enterprise environment. Furthermore, without a correct map, network vulnerabilities may be hidden, assets may be configured improperly, and the enterprise environment may operate inefficiently. Even if a network vulnerability in a type of asset is found, an incorrect map may mean that other assets of a similar type are not readily found leading to a slowdown of incident resolution.

Traditionally, generating a map involves a great deal of manual entry and specialized knowledge due to the fact that each asset type may store data in a different way and be manufactured by different vendors. For example, one networking asset type may use a label of hostname, while another may use "system name," despite both potentially having the same meaning. Another problem arises in that generally it is one person's responsibility to extract data from an asset type, and, when that person leaves, their knowledge leaves with them. Furthermore, if the firmware is updated on the asset, the label may change. Accordingly, polling the asset with existing knowledge may lead to missing or incorrect data.

Another method to generate a map may be to monitor traffic between asset types; however, without knowing the context of the data being transferred, a map may incorrectly indicate a relationship between assets where none actually exists. Given the above problems there exists an opportunity for a more fundamentally data driven approach to generating a map of an enterprise environment.

Figure 1:
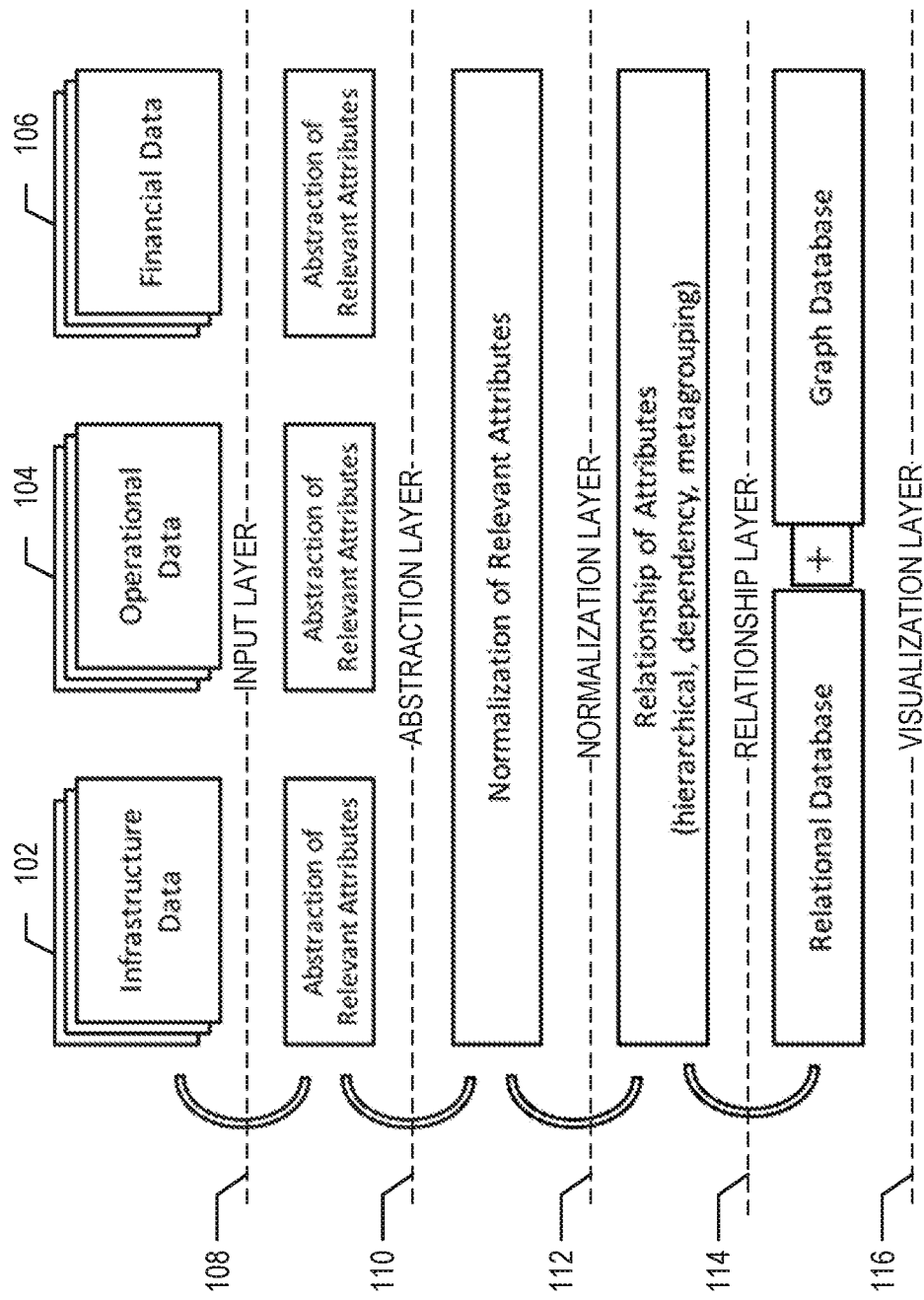
FIG. 1 illustrates a schematic depiction of a layered analysis of enterprise data, according to various examples.

FIG. 1 illustrates a schematic depiction of a layered analysis of enterprise data, according to various examples. FIG. 1 includes input layer 108 with infrastructure data 102, operational data 104, and financial data 106. The figure additionally illustrates abstraction layer 110, normalization layer 112, relationship layer 114, and storage layer 116. Infrastructure data 102 may include configuration files or other source files from infrastructure assets (e.g., input assets 202 in FIG. 2). Operational data 104 may include data on operational requirements (e.g., regulatory, uptime, response time, latency, etc.) for an enterprise. Financial data 106 may identify the costs of assets, profitability of enterprise applications, etc.

The result of the process depicted in FIG. 1 may be a map in the form a relational database and/or graph database. Once the map is generated, a non-technical user may be presented with curated views of the data in storage layer 116 to diagnosis problems, project costs of a change in infrastructure, etc., as discussed in more detail herein.

The space in-between each layer is an opportunity to leverage artificial intelligence (AI) techniques to move from a human-based approach to a machine-based approach. An overview of these opportunities is presented below with a more in-depth discussion following with respect to FIG. 2 and FIG. 3. Using a layered approach allows for different AI techniques for each layer (or multiple AI techniques per layer). Abstraction layer 110 may ingest configuration files, etc., from input layer 108 and abstract them according to a defined ontology or taxonomy. Normalization layer 112 may harmonize the collected data across the different ontologies. Relationship layer 114 may look for relationships between the normalized data, and storage layer 116 may store the data according to the discovered relationships. Storage layer 116 may also be referred to as environment data in various examples.

Additionally, using layers allows for different enterprise personnel with different levels of technical expertise to be used. For example, a specialized engineer may train a cognitive computing engine and/or machine learning model to recognize a subset of data in a configuration file of an asset type that is needed by the relationship layer 114 to link different assets. Then, a product manager may review the output of a cognitive computing engine to train the engine to find relationships relevant to the enterprise (e.g., which computing systems are supporting a public-facing web application).

Once the data has been ingested and automatically processed by the various AI models, machine learning or others, a number of applications become possible. For example, in other domains, predictive analytics using real-time telemetry data assets and machine learning models have been used to identify imminent failures of networks (e.g., users may be unable to connect to a wireless network). However, these analytical techniques are often used for near or real-time failures.

In various examples, machine learning models may use the environment data in storage layer 116 to look for potential failures much farther into the future. For example, instead of focusing on real-time telemetry, the environment data may be analyzed for misconfigurations. These misconfigurations, particularly for things like a failover or disaster recovery scenario, are only invoked during a failure. Accordingly, an enterprise often only uncovers these problems when attempting to activate the recovery—sometimes only once a year if a planning drills is being run for key applications.

Engineers often make mistakes as they configure backup infrastructure, or that configurations drift over time—a server is retired not realizing that it was expected to serve as a backup in some future emergency. These types of issues are hard to manually spot because it may require looking across many different facets and relationships. A machine learning model or other AI technique be used to check on items like whether the backup configuration for fault-tolerant services like DNS, active directory, or NTP are correct.

Similarly, a user could look for secondary dependencies on infrastructure prior to decommissioning the infrastructure; working and protect paths may be validated so that they are both identically provisioned, etc. Basic configuration validation may exist, but typically only focuses on one type of infrastructure (for example Cisco core routers), and only looks at that narrow environment. By using AI, DNS configuration can be consistently extracted for any type of device. Accordingly, measurements/configurations may be taken across hundreds of thousands of systems from all different manufacturers, yet still determine where redundancy was not correctly configured. In various examples, visualizations of the misconfiguration may be presented to a user.

Figure 2:
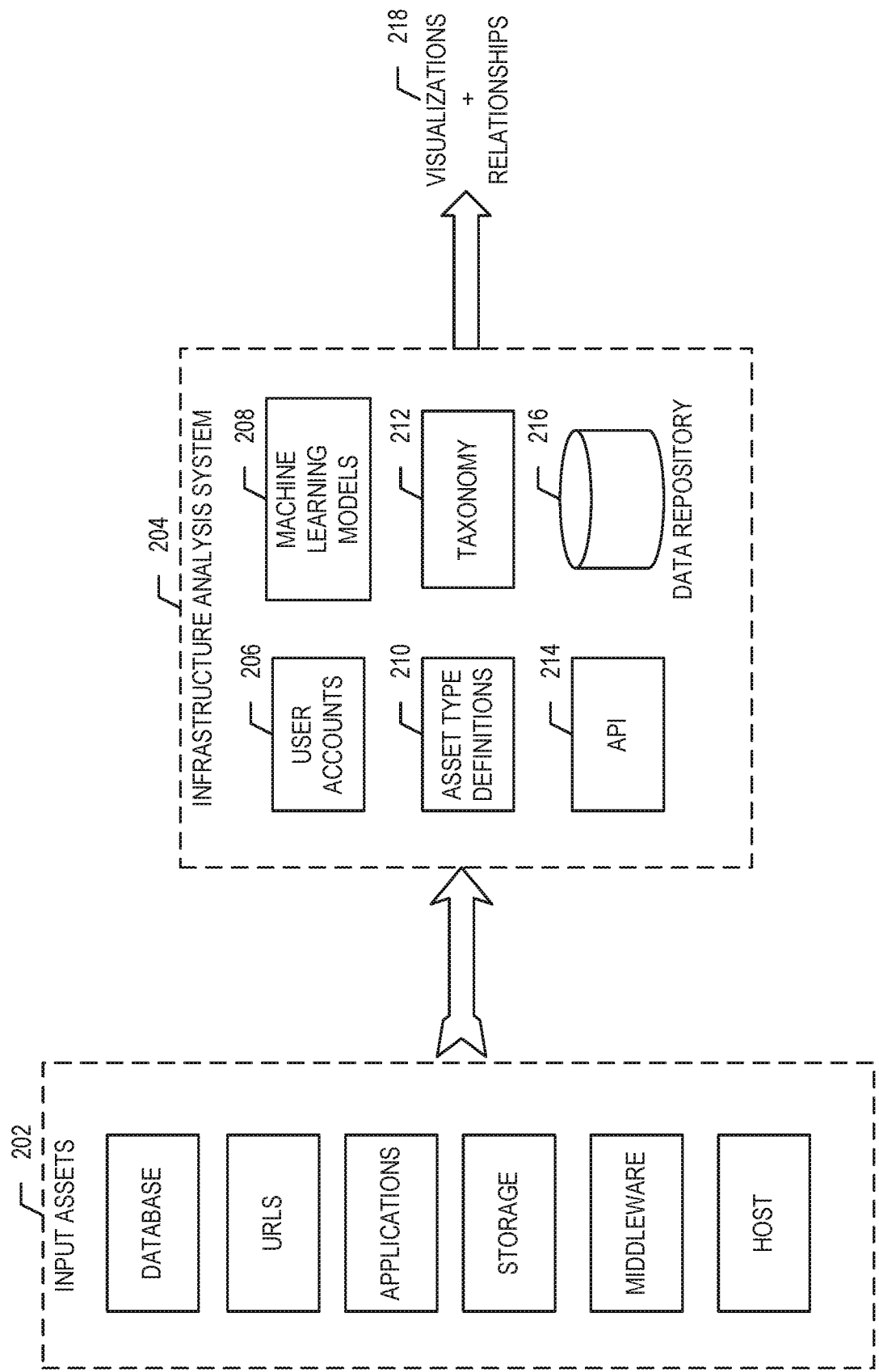
FIG. 2 illustrates components in an infrastructure analysis system, according to various examples.

FIG. 2 illustrates a schematic of components of in an infrastructure analysis system, according to various examples. Infrastructure analysis system 204 includes user accounts 206, machine learning models 208, asset type definitions 210, taxonomy 212, API 214, and data repository 216. Data may originate from one of the assets in input assets 202 into infrastructure analysis system 204. Based on the analysis performed by infrastructure analysis system 204, various visualizations and relationships 218 may be determined and presented to one or more users. The use of machine learning models in FIG. 2 is meant to encompass cognitive computing in addition to statistics based models such as neural networks.

For illustration purposes, infrastructure analysis system 204 is illustrated as set of separate components. However, the functionality of individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2@) using shared computing infrastructure.

In various examples, the assets and components in FIG. 2 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Data used in infrastructure analysis system 204 may be organized and stored in a variety of manners. For convenience, the organized collection of data is described herein as data repository 216. The specific storage layout and model used in data repository 216 may take a number of forms—indeed, data repository 216 may utilize multiple models. Data repository 216 may be, but is not limited to, a relational database (e.g., SQL), non-relational database (NoSQL) a flat file database, object model, document details model, graph database, shared ledger (e.g., blockchain), or a file system hierarchy. Data repository 216 may store data on one or more storage devices (e.g., a hard disk, random access memory (RAM), etc.). The storage devices may be in standalone arrays, part of one or more servers, and may be located in one or more geographic or part of shared computing infrastructure.

User accounts 206 may identify users of infrastructure analysis system 204. A user may access infrastructure analysis system 204 using a client device (not illustrated) such as a smartphone, tablet, laptop, multi-processor system, microprocessor-based or programmable consumer electronics, a set-top box, or any other device that a user utilizes to communicate over a network communicatively coupled to infrastructure analysis system 204.

Infrastructure analysis system 204 may include a web server to permit users to login using their account credentials (as stored in user accounts 206). Upon logging into infrastructure analysis system 204, a user may request views of data stored in data repository 216. For example, a user may request a visualization of all public assets related to publically accessible web applications. Users may have defined roles that limits access to information stored in data repository 216. The roles may also identify which machine learning models 208 a user is allowed to help train. Application programming interface (API) 214 may facilitate retrieval of data from data repository 216 in response to a user request.

Input assets 202 identify a variety of assets that may be queried (or which may periodically transmit) data to infrastructure analysis system 204. The data may include configuration files in various examples discussed further with respect to FIG. 3. The location and type of data retrieved from an input asset may be identified in asset type definitions 210.

Asset type definitions 210 may be refined as one or more machine learning models identifies the subset of data (within a file) required to maintain and generate an enterprise map. Asset type definitions 210 may considered the source of truth. To this end, when a new asset is added to an enterprise, asset type definitions 210 may be used to quickly retrieve information from a configuration file, which may be fed into machine learning models 208 to update data repository 216.

By only storing a subset of the data the system can function much more efficiently than copying all data from assets into the infrastructure analysis system 204. For example, it is unlikely that infrastructure analysis system 204 needs to know the name of the file currently being used a background image for a user's desktop-much like a human specialist would discard this information as not relevant. The type of information that is needed may be learned by a machine learning model. For example, if the background image's file name is never used to tie the desktop to another asset it stands to reason that the file name is not useful.

In some examples, the data may be encoded according to an ontology, such as stored in taxonomy 212. The taxonomy 212 may include abstracted and/or normalized labels for data retrieved from an input asset. For example, some configuration files may label a DNS server as "DNS:" whereas others may "Dynamic Name Server:" At a higher level, taxonomy 212 may be used to categorize the asset itself (e.g., load balancer, application, web server, etc.). Machine learning models may operate more efficiently if data is encoded in a consistent manner.

However, many machine learning models are flexible enough to accept different formats for the same type of data. Indeed, one of the benefits of a deep learning model, such as a neural network, is the ability to accurately categorize data that may appear different to a non-specialist. In essence, a machine learning model may replace the need for having specialized personnel for each asset type, and for different vendors.

Traditionally, different AI techniques have been used depending on the format of the data being analyzed. Data has generally been considered either structured or unstructured. Unstructured data may be free form text such as the body of an e-mail or a transcript of a voice call. Unstructured data may be characterized in its lack of explicit structure. Thus, a parsing program may not readily be able to take unstructured data and find a specific piece of information without some sort of intermediate analysis to encode the data. For example, it is common for natural language processing (NLP) to be used on unstructured data. NLP may take a sentence and break it down into its constituent parts (e.g., subject, object, etc.) based on parts-of-speech. The parts-of-speech may then be fed into a machine learning model for additional processing.

In contrast, structured data is data that has a predefined format (e.g., a schema or other definition) that allows for efficient retrieval of information. For example, a date field in "MM/DD/YYYY" format, or a telephone number presented as "(xxx) xxx-xxxx." There is often no need for intermediate processing to encode information from structured data.

FIG. 3 illustrates a snippet of semi-structured data, according to various examples. Unlike purely structured data or unstructured data, many of the data files from assets contain properties of structured and unstructured data. For example, FIG. 3 illustrates a router configuration snippet that has some structured elements such as IP addresses, but it laid out in a way that may or may not correspond to a predefined format. For example, the snippet indicates "ip address 88.24.9.11 255.255.255.252." Thus, the snippet identifies the IP address of the router and the subnet on the same line, but both are in a X.X.X.X format. Without additional information, it may not be possible for a parsing to know which "X.X.X.X" is the IP address and which is the subnet. Furthermore, traditional NLP may not be useful, either, because a configuration file is not readily machine parsable according to parts-of-speech.

There are a variety of pieces of information outlined in FIG. 3 that may need to be structured (consistently identified to allow machine ingestion) to have meaning. For example, does the hostname "fl-makr-5ar01" have a relationship to one of the Applications found in the URL survey? Should a URL be treated as a single entry or should it be broken down into its constituent parts (e.g., domain, port, etc.)?

In order to parse semi-structured data a number of possible manual solutions exists, but each has drawbacks. For example, it may be possible to develop scripts or acquire tools to fully structure the data and determine relationships between assets. However, there is a time and cost associated with creating the scripts and there are hundreds of discrete data types that should be analyzed. Furthermore, the data types may evolve at different paces. For example, IPv6 may be added as a metadata type for certain platforms that requires tool or script changes. Another challenge is that the metadata (e.g., relationships between assets, cost information, etc.) that may be interesting/relevant varies by situation.

In order to alleviate the problems above, AI techniques may be leveraged to analyze semi-structured data and extract the relevant data. By using AI, the turnaround time of adding an asset to an environment map may be reduced from weeks/months to hours/days. Additionally, resource contention be significantly minimized or continued onboarding of new resources. Also, errors may be reduced that arise from inconsistent or fault correlations between assets.

For example, machine learning models 208 engine may ingest files from assets and determine a number of ways that an IP address is depicted. In some instances, personnel may train the output of machine learning model to correct identifications of data the machine learning model incorrectly labels as IP address. An initial training set of data may be fed into a machine learning model with certain patterns of IP addresses and then the machine learning model may find the location within a configuration file that corresponds to the pattern. In some instances (e.g. a neural network), a piece of data may be labeled as an IP address that does not meet a pattern in the training set. Personnel may approve or disapprove of the labeled data and the neural network may be updated.

The table below indicates some of the data that may be extracted from configuration files.

TABLE 1

| Field | Examples | Comments |
| --- | --- | --- |
| IP Address | 10.4.8.6 (ipv4)<br>2620:160:3001::3a2(ipv6) | Mask may be included in/ or dotted-decimal format |
| Device name | nc-sils-ebr01<br>cpvra00v0031 | May or may not match host portion of FQDN |
| URL | https://testapp.company.net/catalog/<br>http://compancyoffice.com | Often the FQDN portion is the most useful |
| Application Name | SPLK, PMT-Splunk<br>DARE, Data Aggregation<br>Reporting Engine | Shorthand versus long-form names are both used; Remedy app CI-ID is uniquely associated to both |
| Environment | Dev, test, prod, bcp, uat, sit, qa, etc. | Variations in capitalization, etc. |
| Vendor/ Manufacturer | Cisco<br>Checkpoint CP 12600 | Unstructured strings, often with embedded key fields like device model |
| Location | "TMPE + 1305 W 23rd Street + Tempe + AZ + 85282"<br>"O1012 + 10 York Mills Road SW, | Often includes site code in addition to street address, may have serial number or |

TABLE 1-continued

| Field | Examples | Comments |
|---|---|---|
| | Suite 700, 7th Floor + Toronto + Ontario + Canada" | other information appended |

Once the data has been gathered from the different assets, a cognitive computing engine may start to establish relationships between assets. Some of the relationships are listed in Table 2 below with some of the sources of the data.

TABLE 2

| Connection Type | Data Source | Data source type |
|---|---|---|
| Application to URL | APP owners survey | Category 3 |
| URL (FQDN) to IP | Lookup table (from ITAM table) | Category 3 |
| Host to Application | Daily Report (CSV format) | Category 3 |
| IP to Host | Remedy | SOR |
| Application to Database (software) | Remedy | SOR. |
| Application to 3$^{rd}$ party software | Remedy | SOR |
| Application to middleware | Remedy | SOR |
| Application to WAF | F5 Bay Portal | SOR |

As with the identification of the fields initially, a user may help train the machine learning model to identify the relationships indicated in Table 2. For example, a user may initially indicate to the machine learning model that X asset is associated with Y asset, but over time the machine learning model may suggest to the user that X asset is also associated with Z asset. The user may approve or disapprove of the association. Based on the user's response, the machine learning model may be updated to automatically find any other relationships between assets using the same patterns the machine learning model determined related X asset to Z asset.

In another example, the machine learning model may recognize a hierarchy of data within configuration files. Thus, if an IP address is identified in a configuration file, the machine learning model may recognize application URLs that are tied back to the same IP. In another example, the machine learning model may learn that information that comes a line after an IP address in a configuration file from a certain vendor is important for use in tying the asset to another asset (e.g., the next line may be the subnet).

Furthermore, once the relationships are known between assets, more complex information may be layered on top of the relationships. For example, data repository 216 may store operational and cost data that has been extracted from source files of assets or another data repository. Once this information is known, it becomes possible for a user to query infrastructure analysis system 204 to determine metrics such as how much does it cost if X asset goes down or simply how much does this asset cost and how is it performing. This type of information may be presented visually to a user in some instances.

Figure 4:
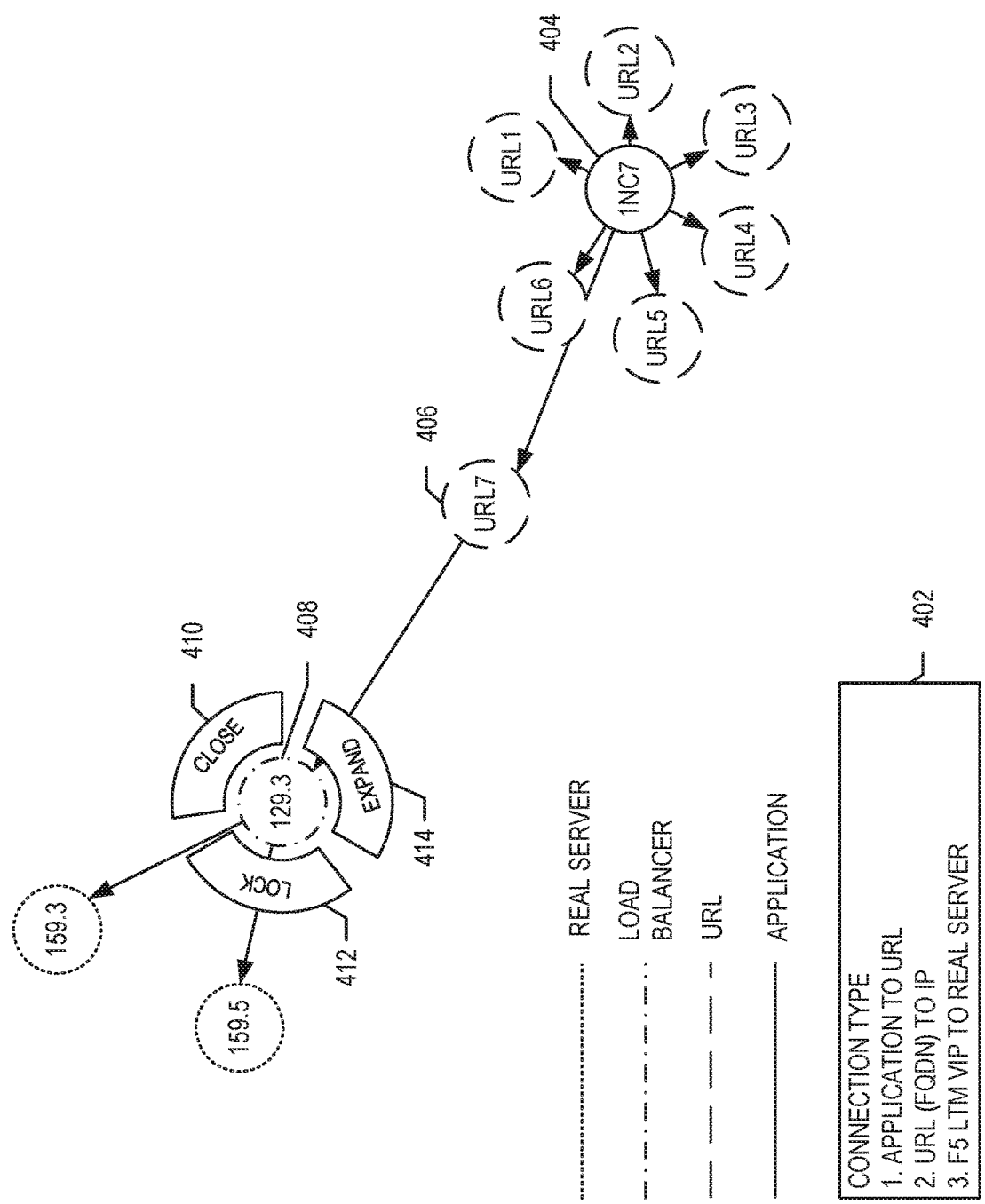
FIG. 4 illustrates a visualization of data in a graph database, according to various examples.

FIG. 4 illustrates a visualization of data in a graph database, according to various examples. Once the data has been retrieved processed and stored, views may be presented to a user to visualize the underlying relationships. Any suitable visualization technique may be used without departing from the scope of the disclosure. For example, in FIG. 4, a graph database is represented as a series of nodes that are selectable by a user. Connection type 402 identifies a query that may result in the visualization. Connection type 402 includes four assets types: application node 404, URL node 406, load balancer node 408, and real servers. FIG. 4, also illustrates node controls close control 410, lock control 412, and expand control 414 that are selectable by a user to deselect a node, show more information (e.g., metadata of the selected asset such as operational/cost data), or lock the node in its current position for visualization purposes.

As a more concrete example of the ingestion and visualization process, consider the following. There may be limited visibility into existing correlations between multiple IT systems and thus an increase additional cyber risk exposure and slowdown in incident resolution. To solve this problem, externally facing Web Applications and their respective components/configurations associated with the components (e.g., externally facing URLs, downstream components related to the applications, embedded software involvement) may need to be identified. By using the process described herein (e.g., in FIG. 1) a correlated view may be generated (e.g., topology map) that will help to discover and remediate existing vulnerabilities and increase speed of incidents resolutions.

In another example, a view may be generated that visualizes all assets with a specific configuration. Thus, if a certain configuration type is considered compromised or leading to unacceptable performance, all assets that need to be updated may be quickly identified. Or a view may be created that shows which asset is the most overloaded from a performance point of view. Or a view may be created that shows assets connected to switches that have gone down. Infrastructure analysis system 204 may store views of the data as described above such that a user may access them at any time.

Figure 5:
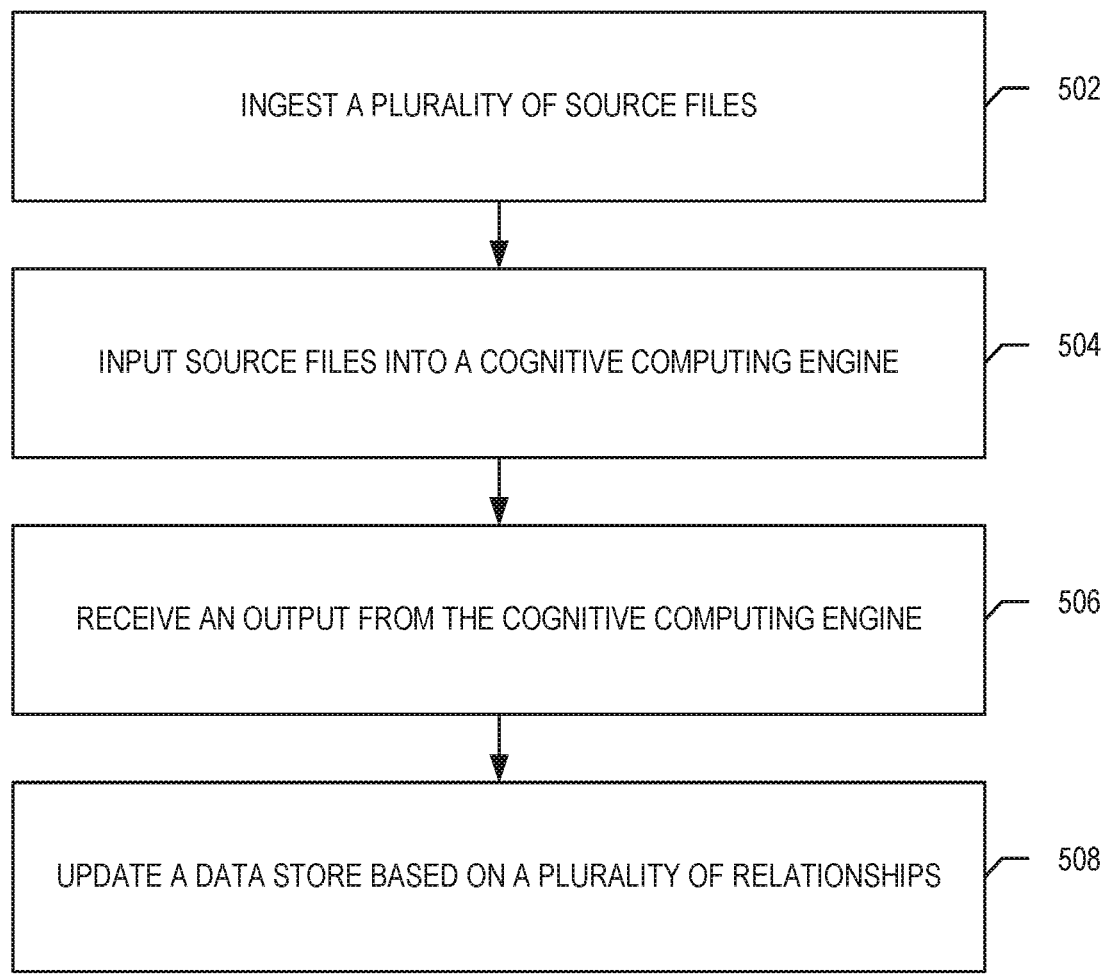
FIG. 5 is a flowchart illustrating a method to process a source files, according to various examples.

FIG. 5 is a flowchart illustrating a method to process a source files, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 5. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

FIG. 5 illustrates operations of ingesting a plurality of sources files (502) from a plurality of infrastructure assets; inputting the plurality of source files into a cognitive computing engine (CCE) (504); receiving an output from the CCE (506), the output indicating a plurality of relationships between the infrastructure assets; and updating a data store based on the plurality of relationships (508).

With respect to operation 502, the plurality of infrastructure assets may be selected from a group comprising, but not limited to: databases, URLs, and applications. The assets may be categorized according to a defined taxonomy. The taxonomy may indicate, for a particular asset class, the location of sources files (e.g., configuration files) for the asset class. Ingesting may include accessing—via an API or other communication protocol—the sources files for the assets.

The source files may include semi-structured data and may be processed to extract a subset of data from the semi-structured data before inputting the sources files into the CCE. The subset of data that is extracted may have been determined according to a previously trained machine learning model. Accordingly, a source file may be inputted into the machine learning model or other AI analytical tool to extract the subset of data. In some instances, the subset of data is further refined (e.g., abstracted and/or normalized) according to a data model before processing by the CCE.

Operations may further include presenting a visualization of the plurality of relationships in the data store. The data store may be a map of the plurality of relationships (e.g., a graph database) or a relational database in some examples. Multiple database types may be used to store the data simultaneously. The visualization may include representations of nodes of the graph database and may identify publically accessible assets with respect to an enterprise. Assets may be identified as publically accessible based on the processed source file information in some examples.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
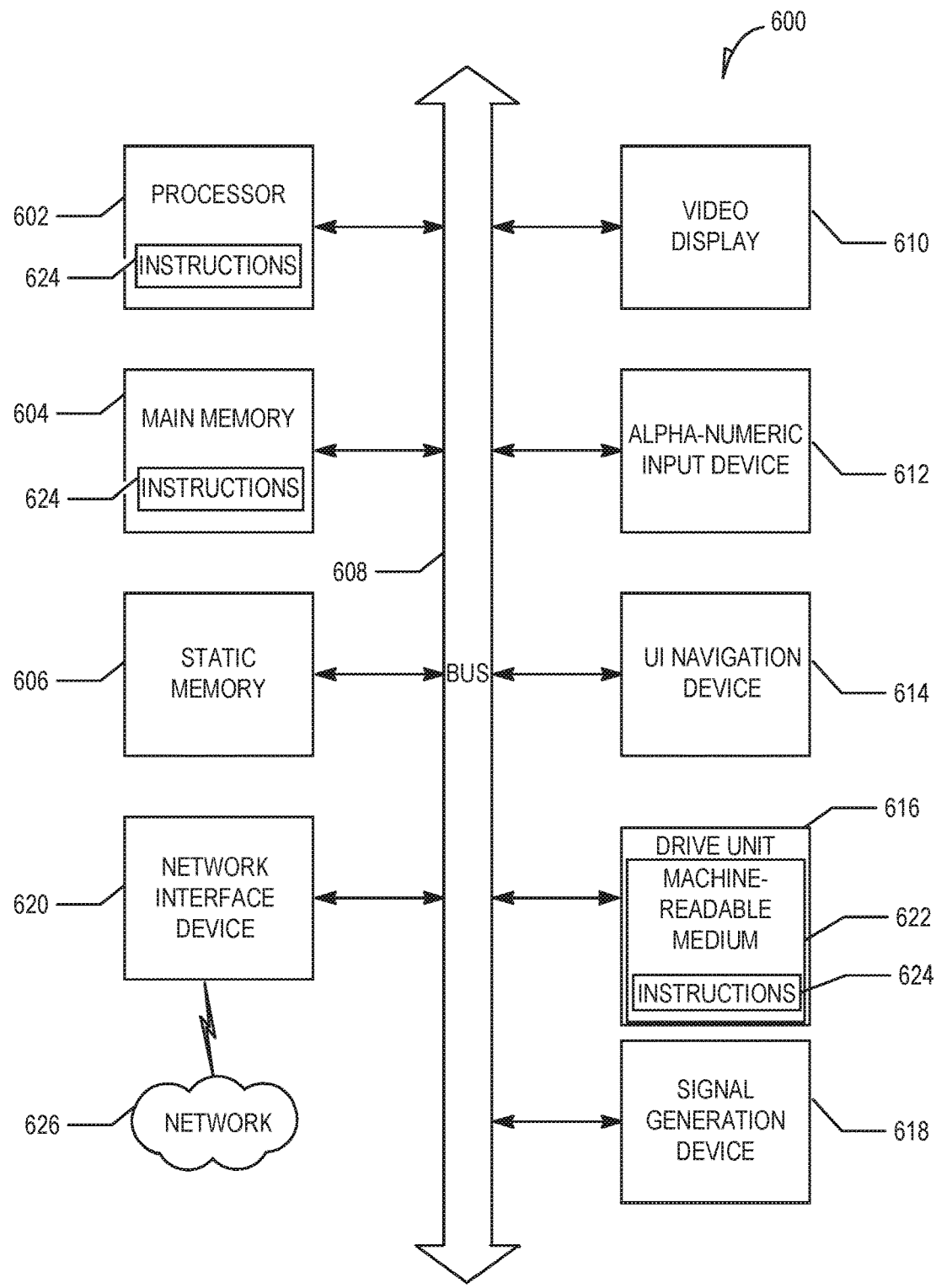
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   retrieving, over a network connection, a first source file of a first infrastructure asset and a second source file of a second infrastructure asset;
   processing the first source file and the second source file by inputting the first source file and the second source file into a first machine learning model, the first machine learning model trained to identify data elements;
   based on output of the first machine learning model, extracting first unlabeled data of a first semi-structured data element from the first source file, and extracting second unlabeled data of a second semi-structured data element from the second source file;
   inputting, using at least one processor, the processed first source file and processed second source file into a second machine learning model, the second machine learning model trained to identify relationship types between infrastructure assets;
   receiving, using the at least one processor, an output from the second machine learning model identifying a plurality of relationships between the infrastructure assets, wherein a relationship of the plurality of relationships indicates the first unlabeled data matches the second unlabeled data; and
   updating, using the at least one processor, a data store based on the output of the second machine learning model to indicate a relationship between the first infrastructure asset and the second infrastructure asset.

2. The method of claim 1, wherein the data store is a graph database.

3. The method of claim 2, further comprising:
   executing a connection type query to the graph database;
   receiving a set of results as a result of the executing; and
   presenting an interactive visualization of the set of results as selectable nodes, the selectable nodes include an application node, a uniform resource locator (URL) node, and a load balancer node.

4. The method of claim 3, further comprising:
   receiving a first selection of a node of the selectable nodes; and
   in response to receiving the first selection, presenting a plurality of control shapes, the plurality of control shapes including a lock position control and a show more information control.

5. The method of claim 4, further comprising:
   receiving a second selection of the show more information control;
   in response to receiving the second selection, querying the graph database for operational cost data associated with the node of the selectable nodes; and
   presenting the operational cost data.

6. The method of claim 1, further comprising:
   receiving feedback for the output from the second machine learning model indicating the relationship of the plurality of relationships is correct; and
   updating weights of the second machine learning model based on the feedback.

7. The method of claim 1, wherein the first source file is a configuration file.

8. A non-transitory computer-readable medium comprising instructions, which when executed by a processing unit, configure the processing unit to perform operations comprising:
   retrieving, over a network connection, a first source file of a first infrastructure asset and a second source file of a second infrastructure asset;
   processing the first source file and the second source file by inputting the first source file and the second source file into a first machine learning model, the first machine learning model trained to identify data elements;
   based on output of the first machine learning model, extracting first unlabeled data of a first semi-structured data element from the first source file, and extracting second unlabeled data of a second semi-structured data element from the second source file;
   inputting, using at least one processor, the processed first source file and processed second source file into a second machine learning model, the second machine learning model trained to identify relationship types between infrastructure assets;
   receiving, using the at least one processor, an output from the second machine learning model identifying a plurality of relationships between the infrastructure assets, wherein a relationship of the plurality of relationships indicates the first unlabeled data matches the second unlabeled data; and
   updating, using the at least one processor, a data store based on the output of the second machine learning model to indicate a relationship between the first infrastructure asset and the second infrastructure asset.

9. The non-transitory computer-readable medium of claim 8, wherein the data store is a graph database.

10. The non-transitory computer-readable medium of claim 9, wherein the instructions, which when executed by the processing unit, further configure the processing unit to perform operations comprising:
executing a connection type query to the graph database;
receiving a set of results as a result of the executing; and
presenting an interactive visualization of the set of results as selectable nodes, the selectable nodes include an application node, a uniform resource locator (URL) node, and a load balancer node.

11. The non-transitory computer-readable medium of claim 10, wherein the instructions, which when executed by the processing unit, further configure the processing unit to perform operations comprising:
receiving a first selection of a node of the selectable nodes; and
in response to receiving the first selection, presenting a plurality of control shapes, the plurality of control shapes including a lock position control and a show more information control.

12. The non-transitory computer-readable medium of claim 11, wherein the instructions, which when executed by the processing unit, further configure the processing unit to perform operations comprising:
receiving a second selection of the show more information control;
in response to receiving the second selection, querying the graph database for operational cost data associated with the node of the selectable nodes; and
presenting the operational cost data.

13. The non-transitory computer-readable medium of claim 8, wherein the instructions, which when executed by the processing unit, further configure the processing unit to perform operations comprising:
receiving feedback for the output from the second machine learning model indicating the relationship of the plurality of relationships is correct; and
updating weights of the second machine learning model based on the feedback.

14. The non-transitory computer-readable medium of claim 8, wherein the first source file is a configuration file.

15. A system comprising:
a processing unit; and
a storage device comprising instructions, which when executed at the processing unit, configure the processing unit to perform operations comprising:
retrieving, over a network connection, a first source file of a first infrastructure asset and a second source file of a second infrastructure asset;
processing the first source file and the second source file by inputting the first source file and the second source file into a first machine learning model, the first machine learning model trained to identify data elements;
based on output of the first machine learning model, extracting first unlabeled data of a first semi-structured data element from the first source file, and extracting second unlabeled data of a second semi-structured data element from the second source file;
inputting, using at least one processor, the processed first source file and processed second source file into a second machine learning model, the second machine learning model trained to identify relationship types between infrastructure assets;
receiving, using the at least one processor, an output from the second machine learning model identifying a plurality of relationships between the infrastructure assets, wherein a relationship of the plurality of relationships indicates the first unlabeled data matches the second unlabeled data; and
updating, using the at least one processor, a data store based on the output of the second machine learning model to indicate a relationship between the first infrastructure asset and the second infrastructure asset.

16. The system of claim 15, wherein the data store is a graph database.

17. The system of claim 16, wherein the instructions, which when executed by the processing unit, further configure the processing unit to perform operations comprising:
executing a connection type query to the graph database;
receiving a set of results as a result of the executing; and
presenting an interactive visualization of the set of results as selectable nodes, the selectable nodes include an application node, a uniform resource locator (URL) node, and a load balancer node.

18. The system of claim 17, wherein the instructions, which when executed by the processing unit, further configure the processing unit to perform operations comprising:
receiving a first selection of a node of the selectable nodes; and
in response to receiving the first selection, presenting a plurality of control shapes, the plurality of control shapes including a lock position control and a show more information control.

19. The system of claim 18, wherein the instructions, which when executed by the processing unit, further configure the processing unit to perform operations comprising:
receiving a second selection of the show more information control;
in response to receiving the second selection, querying the graph database for operational cost data associated with the node of the selectable nodes; and
presenting the operational cost data.

20. The system of claim 15, wherein the instructions, which when executed by the processing unit, further configure the processing unit to perform operations comprising:
receiving feedback for the output from the second machine learning model indicating the relationship of the plurality of relationships is correct; and
updating weights of the second machine learning model based on the feedback.

* * * * *